June 10, 1958 N. C. BEESE 2,838,678

INFRARED IMAGE PICK-UP AND CONVERTER DEVICE

Filed March 30, 1953 2 Sheets-Sheet 1

INVENTOR
N. C. BEESE.
BY
ATTORNEY

June 10, 1958 N. C. BEESE 2,838,678

INFRARED IMAGE PICK-UP AND CONVERTER DEVICE

Filed March 30, 1953 2 Sheets-Sheet 2

INVENTOR
N. C. BEESE.
BY
ATTORNEY 2,838,678

INFRARED IMAGE PICK-UP AND CONVERTER DEVICE

Norman C. Beese, Verona, N. J., assignor to Westinghouse Electric Corporation, East Pittsburgh, Pa., a corporation of Pennsylvania Application March 30, 1953, Serial No. 345,281

3 Claims. (Cl. 250—83.3)

This invention relates to infrared image pick-up and converter devices and, more particularly, to an improved infra-red image pick-up and converter device embodying a low wattage fluorescent glow lamp as a viewing screen and a spherical infra-red radiation gathering mirror.

Infrared image pick-up and converter devices have particular utility for the armed forces as these devices enable an infrared radiating body to be visibly outlined on a screen. For many of these applications it is highly desirable to minimize the weight of the infrared image pick-up and converter unit to enable a man in the field to carry it as a part of his equipment. Heretofore, portable infrared image pick-up and converter devices have utilized a relatively inefficient neon glow discharge lamp as a viewing screen, that is, as a means to convert electrical impulses into visible light, with the result that viewing screen images of the infrared radiating objects were not as bright as desired, and the operating efficiency of the device was correspondingly reduced. Other available lamps which met the requirement of low power consumption, preferably 0.25 watt or less, could not be modulated in the 5,000–10,000 cycle frequency range, which modulation is necessary to provide a proper resolution of the visible reproduction of the infra-red radiating body. In addition, a green colored screen was desired to replace the red glow of the neon lamp, as the eye is much more sensitive to green. Further, the actual light radiating portion of the neon glow lamp was not confined to one plane and was located apart from the envelope of the lamp, thus making resolution of the final visible image relatively more difficult because of parallax and greater scattering of the visible light.

In spite of all the foregoing listed disadvantages of neon glow discharge lamps, they were used because of their low power consumption which outweighed their disadvantages, as it can be readily seen that in any portable field unit low power consumption is of extreme importance, since battery weight must be minimized.

In addition, infrared image pick-up and converter devices have heretofore utilized a telescope arrangement to focus the infrared radiation. The lenses utilized by the telescopic means comprised a glass objective lens and another lens to focus the dissected infrared image onto an infrared sensitive photocell. The chromatic aberration of this glass objective lens prevented the formation of clear, sharp infrared images for, as is well known, the index of refraction of a glass lens will be different for different wavelengths of radiant energy refracted. In addition, a glass lens is opaque to radiations having wavelengths longer than 2.7 microns. Thus, the use of a glass lens to focus infrared radiation presented the dual disadvantages of chromatic aberration and limited transmission.

It is the general object of my invention to overcome the foregoing and other difficulties of and objections to prior art practices by the use of a low wattage fluorescent glow lamp to replace the heretofore used neon glow discharge lamps, in order to produce a brighter, more efficient image on the viewing screen while limiting power consumption of 0.25 watt or less.

Another object of my invention is to provide a low wattage glow discharge lamp which fluoresces with a green color and which lamp has rapid light decay characteristics which enable it to be modulated in the 5,000–10,000 cycles frequency range.

Still another object of my invention is to provide a substantially flat viewing screen for the rapid light decay fluorescent glow lamp, which viewing screen has produced directly on it a visible signal which, when scanned, will correspond to the shape of the infrared radiating object being viewed.

A still further object of my invention is to provide a low wattage fluorescent glow lamp in combination with a scanning means wherein the scanning means is located between the fluorescent excitation source and the fluorescent viewing screen.

Yet another object of my invention is to provide an ultra-violet source to operate in conjunction with an ultraviolet sensitive phosphor and a scanning means, which ultraviolet radiation is not contaminated with visible radiation.

A further object of my invention is to provide a source of ultraviolet radiation with a reflector to evenly produce ultraviolet excitation over a screen coated with ultraviolet sensitive phosphor.

Still another object of my invention is to provide an ultraviolet source, the shape of which closely conforms to the shape of an ultraviolet sensitive phosphor-coated viewing screen, in order to provide even excitation for all parts of the viewing screen.

An additional object of my invention is to provide a spherical infrared radiation gathering mirror to focus the infrared radiation and to eliminate infrared chromoatic aberration.

A still further object of my invention is to provide a spherical infrared radiation gathering mirror which will focus all desired wavelengths of infrared radiation.

The aforesaid objects of the invention, and other objects which will become apparent as the description proceeds, are achieved by providing a low wattage fluorescent glow lamp with a substantially flat viewing screen, which screen is coated with a phosphor having light decay sufficiently rapid to permit modulation in the 5,000–10,000 cycle frequency range, and by replacing the glass lenses in the infrared radiation focusing means with an aluminized spherical gathering mirror having high reflectivity in the near infrared, which will produce infrared images free from chromatic aberration and which will permit all infrared radiant energy to be accurately imaged on an infrared pick-up means.

For a better understanding of my invention, reference should be had to the accompanying drawings wherein.

Although the principles of my invention are broadly applicable to any application requiring a low power modulated light source, or a spherical infrared radiation gathering mirror, my invention has specific application to infrared image pick-up and converter devices and hence it has been so illustrated and will be so described.

Figure 1:
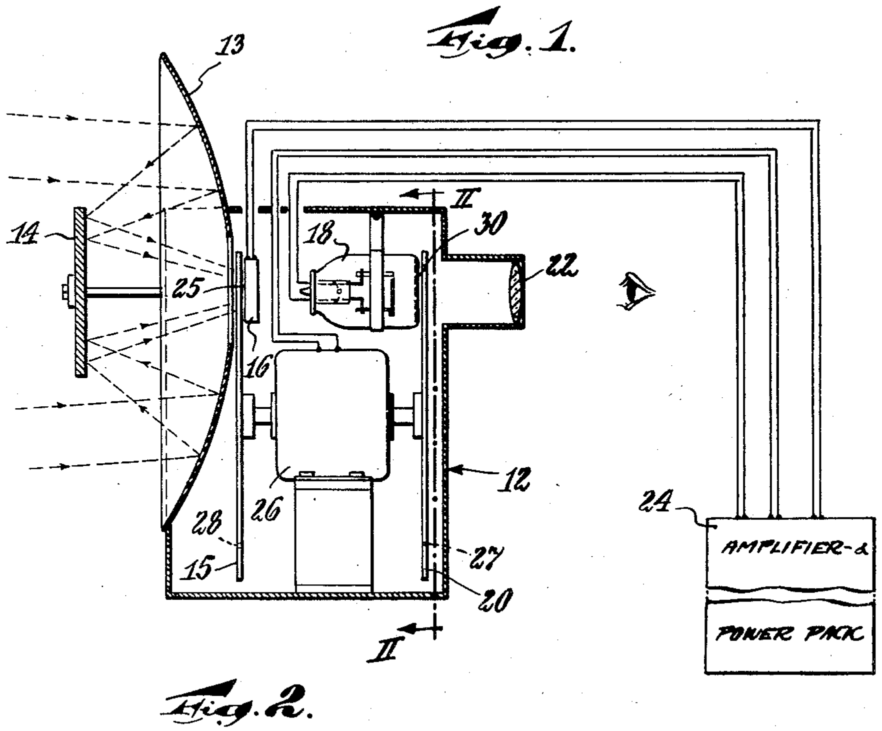
Fig. 1 is a front elevation, partly in section, of the preferred embodiment of an infrared image pick-up and converter device embodying my new and novel low wattage fluorescent glow lamp, and spherical infrared radiation gathering mirror.

With specific reference to the form of the invention, illustrated in the drawings, the numeral 12 indicates the infrared image pick-up and converter unit shown in Fig. 1, which unit comprises an infrared focusing means having a mirror 13 and focusing reflector 14; an infrared pick-up means having a synchronized scanning means 15 and a germanium photocell 16; an infrared converter means having a low wattage fluorescent glow lamp 18, a synchronized scanning means 20, a viewing lens 22 and amplifier-power pack unit 24. The viewing lens 22 is only required, if some magnification of the visual image is desired. It is desirable to use a germanium photocell 16 having a large infrared sensitive area 25 which type photocell does not require an infrared focusing lens because of this relatively large sensitive area. Such germanium photocells are well-known in the art. In addition, the germanium photocell does not respond to radiation below 1.5 microns wavelength, and thus eliminates visible light which constitutes noise in an infrared image pick-up and converter unit.

The mirror 13 may take the shape of a large spherical aluminized gathering mirror, as shown, which is rotatable in both a horizontal and a vertical plane, so as to be readily aimable in the direction of an infrared radiating object. As the infrared radiation is gathered by mirror 13, it is reflected to focusing reflector 14, which focuses the infrared radiation on photocell 16. Rotating scanners 15 and 20 are synchronized with one another, both being driven by a high speed motor 26.

Figure 2:
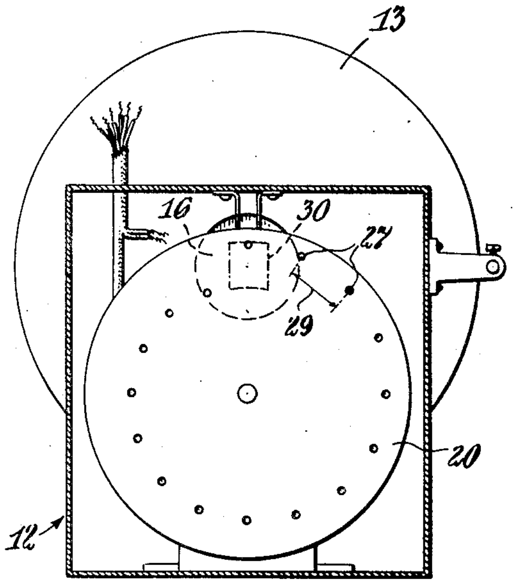
Fig. 2 is a sectional view of the infrared image pick-up and converter device, shown in Fig. 1, taken along the lines II—II in the direction of the arrows.

Scanner 20, as shown in Fig. 2, comprises a rotatable disc perforated with a series of apertures 27. Scanner 15 is identical to scanner 20 and is provided with a series of apertures 28. These apertures 27 and 28 are located at varying distances from the center of rotation of the scanner so that when the scanning disc is rapidly rotated, the projections of the apertures 28 on the infrared sensitive area 25 of photocell 16 will combine to form a composite picture. There is a limitation to the distance between successive apertures 27, since the minimum distance 29 must be slightly greater than the width of the composite scanned viewing screen 30 in order that no more than one aperture 27 will pass light at any one time.

Figure 3:
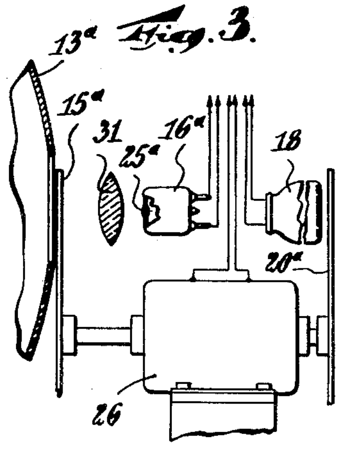
Fig. 3 is a modification of my infrared image pick-up and converter device utilizing another type of infrared sensitive photocell, which cell has a smaller infrared sensitive area and which requires an infrared focusing lens.

In Fig. 3 is represented a possible modification of the infrared pick-up means wherein the germanium photocell 16 is replaced with a photo conductive type (e. g. lead sulphide, lead selenium or lead tellurium) photocell 16a having a much smaller infrared sensitive pick-up area 25a. When this type photocell is utilized, a focusing lens 31 is required. This lens may be a KRS–5 lens, which is transparent to infrared radiation, as is well-known in the art. In this embodiment of my invention, the infrared image is formed on the scanning means 15a rather than the infrared sensitive area 25 of photocell 16 as in the preferred embodiment of my invention.

Figure 4:
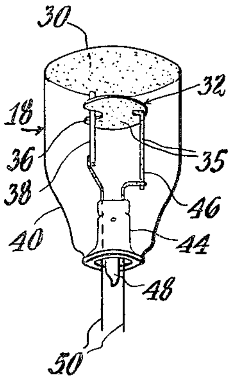
Fig. 4 is a perspective view of the preferred embodiment of my low wattage fluorescent glow lamp.
Figure 5:
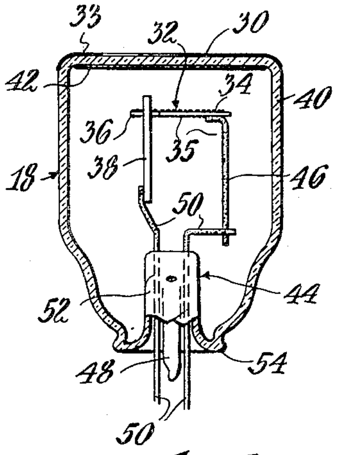
Fig. 5 is a front elevational view, partly in section, showing construction details of the preferred embodiment of my low wattage fluorescent glow lamp.

The lamp 18 is illustrated in perspective in Fig. 4 and partly in section in Fig. 5 and shows the anode and cathode construction of the preferred embodiment of my lamp. Such a lamp may be defined as a cold cathode gaseous glow discharge lamp, and the basic design is commonly used in night lights and switchboard indicator lamps. Preferably, the cathode 32 will be shaped similarly to the substantially flat phosphor coated viewing screen 30 so that the phosphor coating will have an even ultraviolet excitation over its entire surface. The viewing screen is preferably masked on its outer surface with a masking means 33 so that the composite scanned viewing screen, as shown in Fig. 2, will be substantially rectangular. The cathode 32 is of pure sheet nickel coated with carbonate emissive mixture 34 on the active or top surface and with aluminum oxide 35 on the inactive or bottom surface. A recess 36 in cathode 32 is adapted to receive the anode 38 in order to place a larger portion of the cathode closer to the anode to facilitate a more even, efficient discharge.

The substantially flat viewing screen portion 30 of the lamp envelope 40 is preferably circular for convenience of manufacture and, as shown, is approximately one inch in diameter, although this flat viewing screen can take any desired shape or size to meet any special requirements. This flat viewing screen 30 and lamp envelope 40 may be of transparent lime glass, and a fluorescent coating 42 is coated on the inner surface of this flat viewing portion 30.

The phosphor comprising the coating 42 should have a minimum of afterglow following excitation, and should be excited with good efficiency by ultraviolet radiation. The phosphor found to best meet these requirements is supplied by N. J. Zinc Co. and is designated as N. J. Zinc Co. No. 2100 phosphor, which is a green phosphor with a very short phosphorescent component. The composition of this phosphor is zinc oxide with no additional activator added to it. With this zinc oxide phosphor, the factor that limits the use of even higher frequencies than 10,000 cycles is the quenching of the metastable states of the gases that produce afterglow rather than any afterglow due to the phosphor itself. Other phosphors such as calcium tungstate and magnesium tungstate can be used, for calcium tungstate and magnesium tungstate have short phosphorescent components, but have blue and blue-white colors, rather than green. A blue-green filter used in conjunction with the magnesium tungstate phosphor which could be excited by a neon-argon glow would produce an acceptable color and have the other necessary requirements.

The phosphor coating 42 may be coated on the outside surface of the flat viewing screen 30, if desired, and covered with a clear lacquer, for protection against atmospheric moisture and to minimize photo-decomposition. In this case the flat viewing screen 30 should be of ultraviolet transparent glass, such as crystal clear silica glass.

The mount 44 of the lamp 18 includes the anode 38 which consists of pure nickel wire, the cathode 32, cathode support 46, tipped-off exhaust tube 48 and lead-in conductors 50. The lead-in conductors 50 are sealed through the reentrant stem press 52 and are of sufficient rigidity to support the cathode 32 and anode 38, and to serve as terminals for connection to the output of amplifier 24. The inactive or bottom surface of cathode 32, the cathode support 46, and that portion of the lead-in conductors 50 which extend into the lamp envelope 40 are coated with aluminum oxide 35 in order to suppress any glow discharge from these members and to limit the glow discharge to the top surface of the cathode.

When using the special zinc oxide phosphor prepared by the N. J. Zinc Co. designated as N. J. Zinc Co. No.

2100 phosphor, heretofore referred to, the preferable gas mixture within the lamp envelope 40 consists of 85% argon and 15% nitrogen at 15–20 mm. mercury pressure. This will result in near ultraviolet radiation to excite the special zinc oxide phosphor. The nitrogen constitutes the active ultraviolet producing agent by virtue of excitation of nitrogen bands in the near ultraviolet, and the argon constitutes the inert ionizable gas to initiate the discharge.

Figure 6:
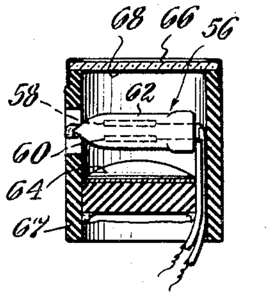
Fig. 6 is an elevational view, partly in section, of a modification of my low wattage fluorescent glow lamp using a reflector in combination with the ultraviolet source in order to evenly distribute the ultraviolet radiation over the phosphor coated viewing screen.

In Fig. 6 is shown a possible modification of my low wattage fluorescent glow lamp, comprising a very small lamp 56 having an anode 58 and a cathode 60 which are contained within the inner envelope 62. This small lamp constitutes an ultraviolet source, the anode 58 being of nickel, the cathode 60 being nickel and coated with carbonate emission material, and the gas mixture within the envelope 62 being smiliar to that used in the preferred embodiment of my lamp, as shown in Figs. 4 and 5. The envelope 62 must pass ultraviolet radiation and may consist of a glass having high transparency for ultraviolet such as crystal clear silica glass, as heretofore noted. A reflector 64 is provided to evenly distribute the ultraviolet radiation over the substantially flat viewing screen 66 of outer envelope 67. Such reflector is preferably parabolic in cross section taken perpendicular to its axis and the cathode 60 is located substantially at the focus. The flat viewing screen 66 may be coated either internally or externally with a phosphor 68. Thus in this embodiment of my lamp the even distribution of the ultraviolet radiation is obtained by a reflector 64, rather than by the shape of the cathode 32, as shown in the preferred embodiment of my lamp in Figs. 4 and 5.

Figure 7:
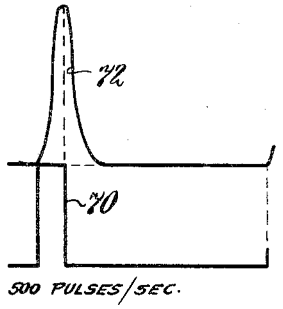
Figs. 7, 8 and 9 are performance curves for the preferred embodiment of my low wattage fluorescent glow lamp showing performance at various excitation frequencies.
Figure 8:
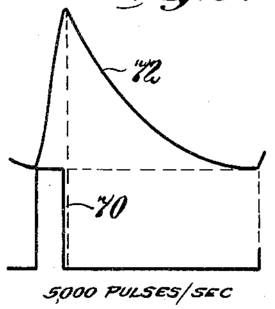
Figure 9:
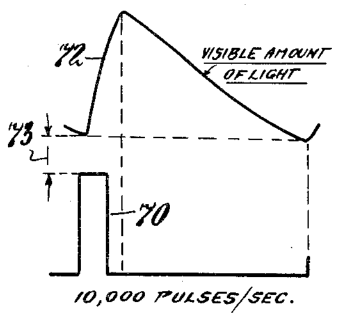

Tests were conducted with my new and novel lamp and oscillogram records were obtained of the performance. These records are duplicated in Figs. 7, 8 and 9. In each case the voltage 70 from a square wave generator (not shown) was applied for about 10% of the cycle. The light output 72 was recorded with a photomultiplier and the applied voltage and light output were superimposed on a dual beam cathode ray oscilloscope to produce the figures as represented. As can be seen, the lamp may be modulated at a frequency of 10,000 cycles at which frequency the minimum residual afterflow is 25% of the maximum peak light intensity. This 25% residual afterglow is represented by ordinate 73 in Fig. 9 and it has been found that the minimum residual afterglow cannot exceed this 25% value, if proper modulation is to be effected.

Figures 10, 11:
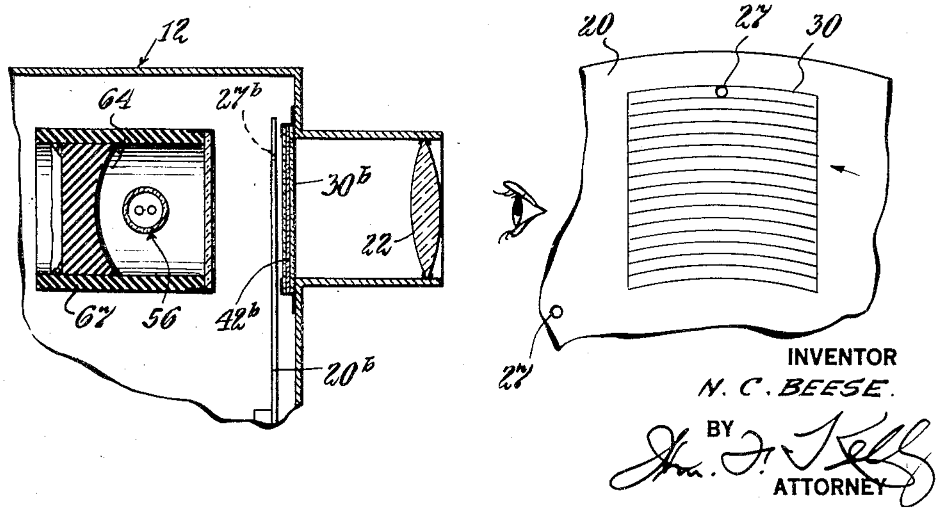
Fig. 10 is a fragmentary sectional elevational view of an infrared image pick-up and converter device, showing a modification of my low wattage fluorescent glow lamp wherein the scanning disc is located between the ultraviolet source and the fluorescent screen.
Fig. 11 is a fragmentary enlargement of the masked composite scanned viewing screen and scanner shown in Fig. 2.

As a possible modification of my device, I have placed the rotating scanner 20b, as shown in Fig. 10, between the ultraviolet source and the phosphor coated viewing screen 30b. It is obvious that with an equivalently rapid decay phosphor, the scanner 20b may be rotated much more rapidly than the scanner 20, as shown in Fig. 1, with greatly improved resolution. This is because the ultraviolet excitation will only pass the scanners when permitted to do so by the apertures 27b, and in this modification of my invention, the scanner selects the ultraviolet excitation, rather than the visible light passing to the eye. Alternately, in the modification as shown in Fig. 10, a much slower decay fluorescent screen may be used to achieve results equivalent to those obtained in the preferred embodiment of my invention, as shown in Fig. 1. For example, if there are sixteen apertures 27b in scanner 20b, the phosphor need only decay to 25% of its peak value within the period required for one complete revolution of the scanner. In contrast, in the preferred embodiment of my invention, as shown in Fig. 1, where the scanner selects the visible light rather than the ultraviolet excitation, the decay time of the phosphor must be such that there is a 75% light decay from peak intensity in such a time interval as is required to rotate the scanner 20 from one scanned portion of the viewing screen 30 to the next scanned portion. By way of further explanation, there is shown in Fig. 11 a fragmentary enlargement of the masked composite scanned viewing screen 30 and the scanner 20, as shown in Fig. 2. As there are sixteen scanning apertures 27 provided in scanner 20, as shown, the light must decay to 25% of its peak intensity within the time required for one aperture 27 to move $1/16$ the distance across the masked viewing screen 30. There are thus sixteen adjacent scanned portions on the viewing screen which each scanning aperture traverses in one revolution of scanner 20. Assuming the motor 26 to have a speed of 40 rev./sec., the light decay time for the phosphor 42 as used in the preferred embodiment of my lamp, shown in Figs. 1 and 2, must be: 40 rev./sec.×16 apertures/rev.×sixteen adjacent scanned portions/aperture=10,000 adjacent scanned portions/second. Thus, since the light must decay 75% between adjacent scanned portions, as heretofore noted, it can readily be seen that the modulation of the lamp 20, shown in the preferred embodiment of Figs. 1 and 2, will necessarily be 10,000 cycles/second where the motor speed is 40 rev./sec. and there are sixteen apertures 27 in the scanner 20. Thus the lamp 18 must be capable of being modulated at the 10,000 cycles/sec. rate. In contrast, where the embodiment shown in Fig. 10 is utilized, the ultraviolet excitation radiation is scanned and the light decay of phosphor 42b need only be sufficiently rapid to decay to 25% of the maximum peak light intensity once every complete revolution of the scanner 20b, since each adjacent scanned portion of the viewing screen 30b can be subject to ultraviolet excitation only once every complete scanner revolution. Thus, if there are sixteen apertures 27 in scanner 20, the light decay of the phosphor in the preferred embodiment of my invention, as shown in Figs. 1 and 2, must be 16×16 or 256 times as fast as the light decay required in the embodiment shown in Fig. 10 in order to produce the same results. As shown in Fig. 10, the scanner must lie very close to the phosphor coated viewing screen 30b to prevent scattering of the ultraviolet excitation after it passes the apertures 27b of scanner 20b, or alternatively, a focusing lens (not shown) must be used either between the ultraviolet excitation source and the scanner 20b or between the scanner 20b and the phosphor coated viewing screen 30b to prevent any scattering of the ultraviolet radiation. As shown, the phosphor coating 42b on viewing screen 30b is located between two flat, transparent glasses, but, as heretofore noted, the phosphor 42b may be coated either on the inside or outside of a flat glass transparent viewing screen 30b. Of course, wherever glass is required to pass ultraviolet radiation, it should be made ultraviolet transparent, as heretofore noted.

*Operation*

Infrared radiation from the different portions of the infrared radiating body (not shown) will strike different portions of the mirror 13 and focusing reflector 14. An infrared image is then formed on the infrared sensitive area 25 of photocell 16 by the infrared radiation passing through the apertures 28 in rotating scanner 15. The photocell 16 converts this scanned infrared radiation into electrical pulses, conforming to the scanned infrared radiation received, which electrical pulses are amplified as necessary by amplifying means 24 and applied across lead-in conductors 50 of lamp 18. This causes a glow discharge which excites phosphor coating 42, causing it to fluoresce. The rotating scanner 20 is synchronized with scanner 15, and the apertures 27 therein correspond to the apertures 28 in scanner 15. As phosphor coating 42 fluoresces momentarily due to the ultraviolet excitation pulse, the aperture in scanner 20 which corresponds to an equivalent aperture in scanner 15 will permit a person looking into viewing lens 22 to see a green visual indication corresponding to the original infrared radiation passing the equivalent aperture in scanner 15.

With rapidly rotating scanners, the visual dots passed by the apertures will resolve into a composite picture, clearly representing in visible light the scanned infrared image formed at the photocell 16. It can be readily seen why the fluorescent coating 42 of lamp 18 is required to have rapid decay characteristics, for if the light decay were not extremely rapid, the light from one excitation pulse would carry over into another excitation pulse and a distorted image would result. As heretofore noted, with a rapidly rotating scanner it has been found necessary to have a lamp which can be modulated at 10,000 cycles and have sufficient light decay between excitation pulses such that the amplitude of the decayed light is not more than 25% of the maximum peak light intensity.

It will be recognized that I have provided a low wattage fluorescent glow lamp having a power consumption no greater than 0.25 watt which lamp has green fluorescent characteristics and which may be modulated in the 5,000–10,000 cycle frequency range. This has been accomplished without any increase in battery weight for the infrared image pick-up and converter unit, and has greatly increased the efficiency and performance of the unit. It will also be recognized that I have provided a spherical infrared radiation gathering mirror which eliminates all infrared chromatic aberration and which focuses all wavelengths of infrared radiation.

While in accordance with the patent statutes, one best known embodiment of my invention has been illustrated and described in detail, it is to be particularly understood that the invention is not limited thereto or thereby.

I claim:

1. A cold cathode gaseous glow discharge fluorescent lamp comprising an outer envelope having a substantially flat viewing screen with an ultraviolet sensitive phosphor coated thereon, an inner envelope of ultraviolet transparent material, an anode and a cathode within said inner envelope, an inert ionizable gas and a gas for producing ultraviolet radiation contained within said inner envelope, lead-in conductors sealed through said inner and outer envelopes and connecting to said anode and said cathode, ultraviolet reflecting means within said outer envelope and located opposite said inner envelope from said viewing screen, and said ultraviolet reflecting means being so positioned and of such configuration as to evenly reflect radiation from said inner envelope to said viewing screen.

2. A cold cathode gaseous glow discharge fluorescent lamp comprising an inner envelope and an outer envelope and a substantially flat viewing screen with an ultraviolet sensitive phosphor coated thereon, said inner envelope being spaced in close proximity to but apart from said viewing screen, an anode and a cathode within said inner envelope, an inert ionizable gas and a gas for producing ultraviolet radiation contained within said inner envelope, lead-in conductors sealed through said envelopes and connecting to said anode and said cathode, ultraviolet reflecting means within said outer envelope and spaced apart but in close proximity to said inner envelope and positioned opposite said inner envelope from said viewing screen, and said ultraviolet reflecting means being so positioned and of such configuration as to evenly reflect radiation from said inner envelope to said viewing screen, and all of the envelope material interposed between said ultraviolet reflecting means and said viewing screen being ultraviolet transparent.

3. In combination with means for forming an infrared image of an infrared radiating body, means for scanning said infrared image and means for converting said scanned infrared image into electrical pulses, a cold cathode gaseous glow discharge fluorescent lamp comprising an inner envelope and an outer envelope and a substantially flat viewing screen positioned without said envelopes and coated with an ultraviolet sensitive phosphor, said inner envelope being spaced in close proximity to but apart from said viewing screen, an anode and a cathode within said inner envelope, an inert ionizable gas and a gas for producing ultraviolet radiation contained within said inner envelope, lead-in conductors sealed through said envelopes and connecting to said anode and said cathode, ultraviolet reflecting means within said outer envelope and spaced apart but in close proximity to said inner envelope and positioned opposite said inner envelope from said viewing screen, said ultraviolet reflecting means being so positioned and of such configuration as to evenly reflect radiation from said inner envelope to said viewing screen, all of the envelope material interposed between said ultraviolet reflecting means and said viewing screen being ultraviolet transparent, a second scanning means synchronized with said infrared image scanning means and interposed between said glow discharge lamp and said phosphor-coated viewing screen, and said glow discharge lamp being modulable in response to said electrical pulses received from said infrared image converting means.

References Cited in the file of this patent

UNITED STATES PATENTS

| | | |
|---|---|---|
| 1,929,526 | Szigeti | Oct. 10, 1933 |
| 1,999,653 | Case | Apr. 30, 1935 |
| 2,028,475 | Rockwell | Jan. 21, 1936 |
| 2,032,588 | Miller | Mar. 3, 1936 |
| 2,357,732 | Ehrlich | Sept. 5, 1944 |
| 2,409,769 | Leyshon | Oct. 22, 1946 |
| 2,521,571 | Du Mont et al. | Sept. 5, 1950 |